(12) United States Patent
Gill

(10) Patent No.: US 6,674,616 B2  
(45) Date of Patent: Jan. 6, 2004

(54) SPIN VALVE SENSOR WITH A BIASING LAYER ECERTING A DEMAGNETIZING FIELD ON A FREE LAYER STRUCTURE

(75) Inventor: Hardayal Singh Gill, Palo Alto, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 305 days.

(21) Appl. No.: 09/832,248

(22) Filed: Apr. 9, 2001

(65) Prior Publication Data

US 2002/0163765 A1 Nov. 7, 2002

(51) Int. Cl.[7] ............................................... G11B 5/39
(52) U.S. Cl. .............................. 360/324.12; 360/324.11
(58) Field of Search ......................... 360/324.1, 324.11, 360/324.12, 324.2, 317

(56) References Cited

U.S. PATENT DOCUMENTS

| | | |
|---|---|---|
| 5,422,571 A | 6/1995 | Gurney et al. ............... 324/252 |
| 5,561,368 A | 10/1996 | Dovek et al. ............... 324/252 |
| 5,654,854 A | 8/1997 | Mallary ...................... 360/113 |
| 5,701,222 A | 12/1997 | Gill et al. ................... 360/113 |
| 5,705,973 A | 1/1998 | Yuan et al. ................. 338/32 R |
| 5,747,997 A | 5/1998 | Dahlberg et al. ........... 324/252 |
| 5,748,399 A | 5/1998 | Gill ............................. 360/66 |
| 5,768,069 A | 6/1998 | Mauri ......................... 360/113 |
| 5,780,176 A | 7/1998 | Iwasaki et al. ............. 428/692 |
| 5,825,595 A | 10/1998 | Gill ............................ 360/113 |
| 5,828,529 A | 10/1998 | Gill ............................ 360/113 |
| 5,856,897 A | 1/1999 | Mauri ......................... 360/113 |
| 5,880,913 A | 3/1999 | Gill ............................ 360/113 |
| 5,898,549 A | 4/1999 | Gill ............................ 360/113 |
| 5,903,415 A | 5/1999 | Gill ............................ 360/113 |
| 5,920,446 A | 7/1999 | Gill ............................ 360/113 |
| 5,966,323 A | 10/1999 | Chen et al. ................. 365/158 |
| 6,040,961 A | 3/2000 | Gill ............................ 360/113 |
| 6,046,892 A | 4/2000 | Aoshima et al. ............ 360/113 |
| 6,117,569 A * | 9/2000 | Lin et al. .................... 428/692 |
| 6,157,524 A * | 12/2000 | Nakazawa et al. ..... 360/324.12 |
| 6,268,985 B1 * | 7/2001 | Pinarbasi ............... 360/324.12 |
| 6,275,362 B1 * | 8/2001 | Pinarbasi ............... 360/324.12 |
| 6,292,336 B1 * | 9/2001 | Horng et al. .......... 360/324.12 |
| 6,400,536 B1 * | 6/2002 | Gill ....................... 360/324.12 |
| 6,414,826 B1 * | 7/2002 | Gill ....................... 360/324.12 |
| 6,430,014 B1 * | 8/2002 | Gill ....................... 360/324.12 |
| 6,445,552 B1 * | 9/2002 | Gill ............................ 360/319 |
| 6,466,419 B1 * | 10/2002 | Mao ..................... 360/324.12 |
| 6,473,279 B2 * | 10/2002 | Smith et al. .......... 360/324.12 |
| 6,515,838 B1 * | 2/2003 | Gill ....................... 360/324.12 |
| 6,519,122 B1 * | 2/2003 | Kakihara ............... 360/324.12 |
| 6,538,860 B1 * | 3/2003 | Kakihara et al. ...... 360/324.12 |

OTHER PUBLICATIONS

*IEEE Transactions on Magnetics*, vol. 35/No. 2, Mar. 1999, "Spin Valve and Dual Spin Valve . . . ".

* cited by examiner

Primary Examiner—Jefferson Evans  
(74) Attorney, Agent, or Firm—Ervin F. Johnston (57) ABSTRACT

A spin valve sensor is provided with a biasing layer which produces a demagnetizing field which supports a demagnetizing field from a pinned layer structure in counterbalancing a sense current field on the free layer structure. The biasing layer has a high resistance so that a sense current is not excessively shunted therethrough and is a specular reflector so as to reflect conduction electrons to increase a magnetoresistive coefficient dr/R of the sensor. In the preferred embodiment the pinned layer structure is an antiparallel (AP) pinned layer structure.

42 Claims, 6 Drawing Sheets

FIG. 9 (ABS)

SPIN VALVE SENSOR WITH A BIASING LAYER ECERTING A DEMAGNETIZING FIELD ON A FREE LAYER STRUCTURE

BACKGROUND OF THE INVENTION

1. Field of the Invention

The present invention relates to a spin valve sensor with a biasing layer and, more particularly, to a biasing layer which produces a demagnetizing field which supports a demagnetizing field from a pinned layer structure in opposing a sense current field at a free layer structure in the spin valve sensor.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive first spacer layer sandwiched between a ferromagnetic pinned layer structure and a ferromagnetic free layer structure. An antiferromagnetic pinning layer interfaces the pinned layer structure for pinning a magnetic moment of the pinned layer structure 90° to an air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from a rotating magnetic disk. The quiescent position, which is parallel to the ABS, is the position of the magnetic moment of the free layer structure with the sense current conducted through the sensor in the absence of signal fields.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of $\cos \theta$, where $\theta$ is the angle between the magnetic moments of the pinned and free layer structures. The sensitivity of the sensor is quantified as magnetoresistive coefficient $dr/R$ where $dr$ is the change in the resistance of the sensor as the magnetic moment of the free layer structure rotates from a position parallel with respect to the magnetic moment of the pinned layer structure to an antiparallel position with respect thereto and $R$ is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top or a bottom spin valve sensor depending upon whether the pinning layer is located near the bottom of the sensor close to the first read gap layer or near the top of the sensor close to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with magnetic moments of the ferromagnetic layers being antiparallel. Spin valve sensors are still further classified as single or dual wherein a single spin valve sensor employs only one pinned layer and a dual spin valve sensor employs two pinned layers with the free layer structure located therebetween.

The transfer curve of a spin valve sensor is defined by the aforementioned $\cos \theta$ where $\theta$ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is parallel to the ABS and the direction of the magnetic moment of the pinned layer is perpendicular to the ABS in a quiescent state (no signal from the magnetic disk) the positive and negative readback signals should be equal when sensing positive and negative fields that are equal from the magnetic disk. Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. When the readback signals are asymmetrical, signal output and dynamic range of the sensor are reduced. Readback asymmetry is defined as $$\frac{V_1 - V_2}{\max(V_1 \text{ or } V_2)}$$

For example, +10% readback asymmetry means that the positive readback signal $V_1$ is 10% greater than it should be to obtain readback symmetry. 10% readback asymmetry is acceptable in some applications, +10% readback asymmetry may not be acceptable in applications where the applied field magnetizes the free layer close to saturation. The designer strives to improve asymmetry of the readback signals as much as practical with the goal being symmetry.

The location of the transfer curve relative to the bias point is influenced by four major forces on the free layer of a spin valve sensor, namely a ferromagnetic coupling field $H_{FC}$ between the pinned layer and the free layer, a net demagnetizing (demag) field $H_D$ from the pinned layer, a sense current field $H_I$ from all conductive layers of the spin valve except the free layer, a net image current field $H_{IM}$ from the first and second shield layers.

A net image current field $H_{IM}$ is obtained by offsetting the spin valve sensor between the first and second read gap layers. For instance, if the spin valve sensor is offset closer to the second shield layer with a thinner second read gap layer the image current field $H_{IM}$ from the second shield layer will be greater than the net image current field $H_{IM}$ from the first shield layer which causes the aforementioned net image current field $H_{IM}$ on the free layer structure. Unfortunately, a thin second read gap layer increases the risk of shorting between the lead layers and the second shield layer. In order to overcome this problem the thickness of the second read gap layer can be increased. Unfortunately, this increases the read gap between the first and second shield layers which reduces the linear bit density of the read head.

In order to reduce demagnetizing field from the pinned layer on the free layer, the pinned layer may be an antiparallel (AP) pinned layer structure. An AP pinned layer structure has an antiparallel coupling (APC) layer which is located between ferromagnetic first and second AP pinned layers. The first and second AP pinned layers have magnetic moments which are antiparallel with respect to one another because of a strong antiferromagnetic coupling therebetween. The AP pinned layer structure is fully described in commonly assigned U.S. Pat. No. 5,465,185 which is incorporated by reference herein. Because of the partial flux closure between the first and second AP pinned layers only a small net demagnetizing field is exerted on the free layer. Because of the small demagnetizing field the exchange coupling between the AP pinned layer structure and the pinning layer is increased for promoting high stability of the spin valve sensor when subjected to unwanted magnetic fields in the presence of elevated temperatures.

Unfortunately, a small demagnetizing field from an AP pinned layer structure makes it difficult to counterbalance the strong sense current field $H_I$ from the sense current. In some spin valve sensors the ferromagnetic coupling field $H_{FC}$ is very small or zero. This then leaves only the net image current field $H_{IM}$ from a gap offset in order to provide a field at the free layer structure to support the small net demagnetizing field from the pinned layer structure to oppose the sense current field from the sense current. As stated hereinabove, it is undesirable to employ the gap offset to obtain the net image current field $H_{IM}$ because of the problem with shorting between the lead layers and one or more of the shield layers.

SUMMARY OF THE INVENTION

The present spin valve sensor has a biasing layer with a demagnetizing field which supports the net demagnetizing field in opposing the sense current field $H_I$ exerted on the free layer structure. With this arrangement the net demagnetizing field of the pinned layer structure and the biasing layer are parallel with respect to one another. The present invention obviates the necessity of a ferromagnetic coupling field $H_{FC}$ and/or a net image current field $H_{IM}$ to counterbalance the sense current field $H_I$ in order to properly bias the free layer structure. An aspect of the invention is that the sense current $I_S$ is fed through the spin valve sensor in a direction which causes the sense current field $H_I$ to orient the magnetic moment of the biasing layer so that the demagnetizing field of the biasing layer supports the net demagnetizing field of the pinned layer structure.

In another aspect of the invention the biasing layer is composed of a material which causes specular reflection of conduction electrons back into the mean free path of conduction electrons so as to increase the magnetoresistive coefficient dr/R. A still further aspect of the present invention is that the pinned layer structure is an antiparallel (AP) pinned layer structure which produces a small net demagnetizing field. As stated hereinabove, the AP pinned layer structure promotes high stability for the spin valve sensor. Still another aspect of the invention is that the second AP pinned layer, which interfaces the spacer layer, is magnetically thicker than the first AP pinned layer. With each of the first and second AP pinned layers composed of a cobalt based material, the thicker second AP pinned layer next to the spacer layer will promote an increase in the magnetoresistive coefficient dr/R. Accordingly, the second AP pinned layer controls the orientation of the net demagnetizing field from the AP pinned layer structure on the free layer structure.

An object of the present invention is to provide a spin valve sensor wherein a free layer therein can be properly biased without a ferromagnetic coupling field $H_{FC}$ and/or a net image current field $H_{IM}$.

Another object is to provide a method for making the aforementioned spin valve sensor.

Other objects and attendant advantages of the invention will be appreciated upon reading the following description taken together with the accompanying drawings.

DESCRIPTION OF THE PREFERRED EMBODIMENTS

Magnetic Disk Drive

Figures 1, 2:
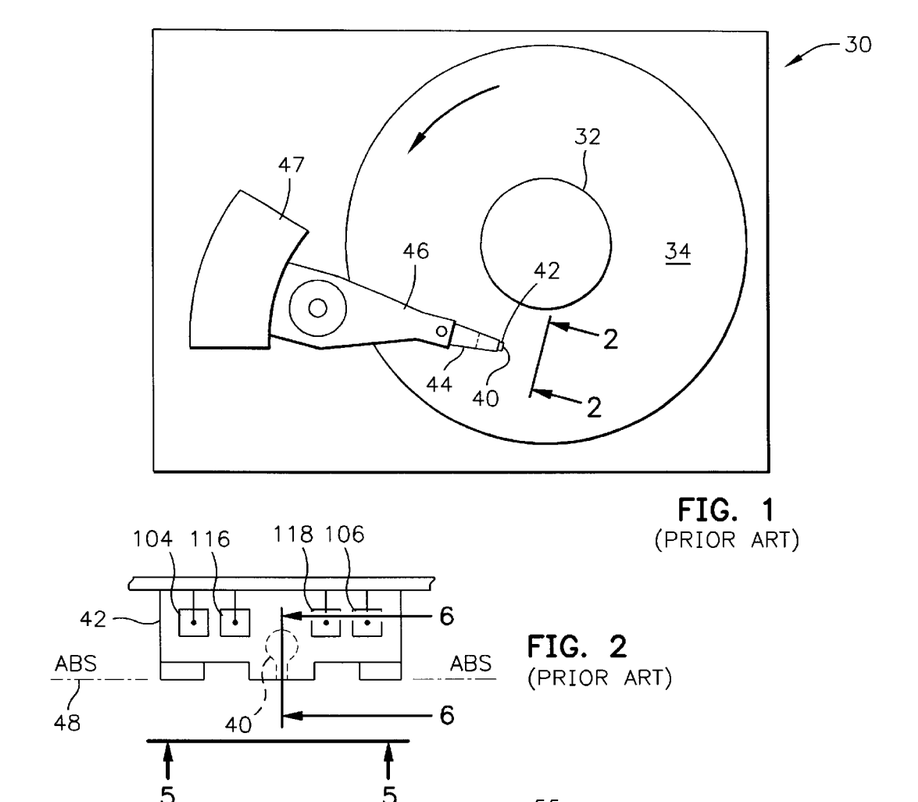
FIG. 1 is a plan view of an exemplary magnetic disk drive.
FIG. 2 is an end view of a slider with a magnetic head of the disk drive as seen in plane 2—2 of FIG. 1.
Figure 3:
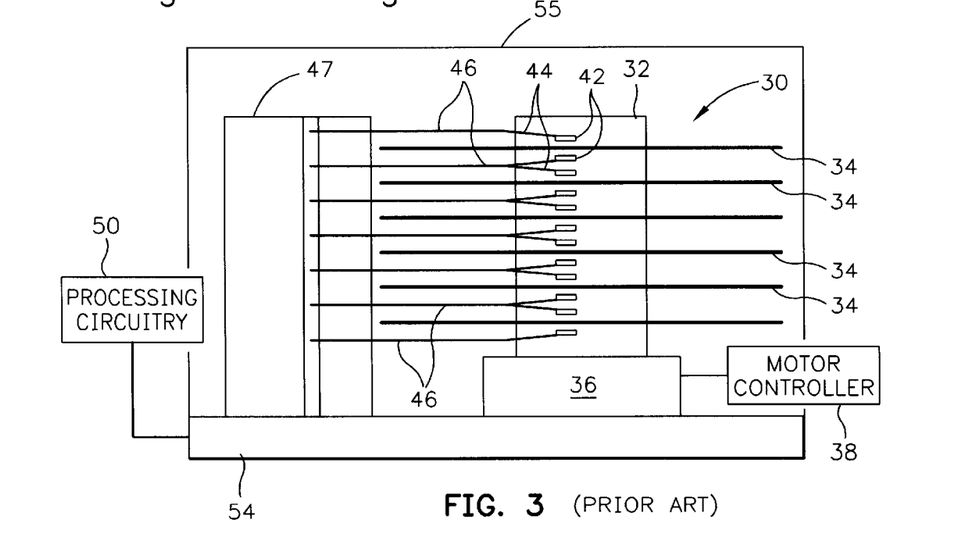
FIG. 3 is an elevation view of the magnetic disk drive wherein multiple disks and magnetic heads are employed.
Figure 4:
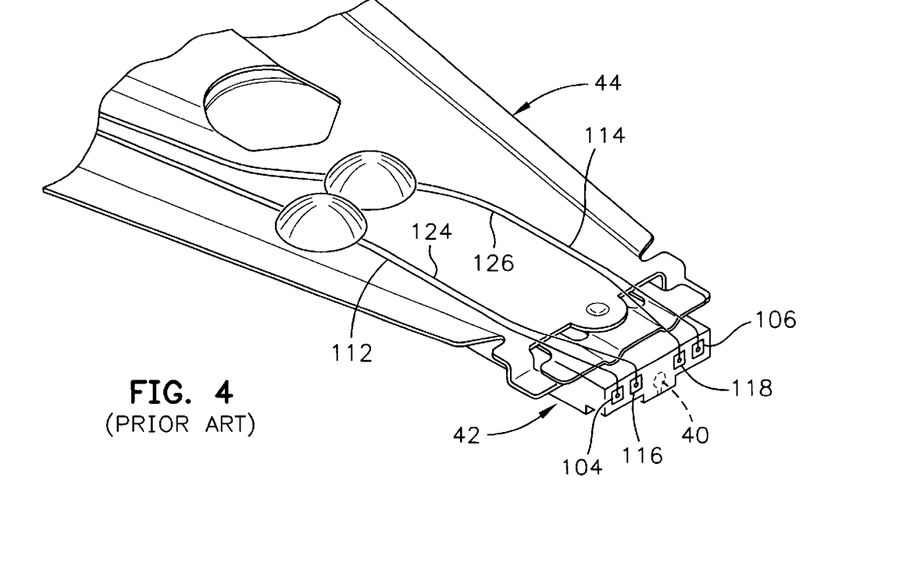
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
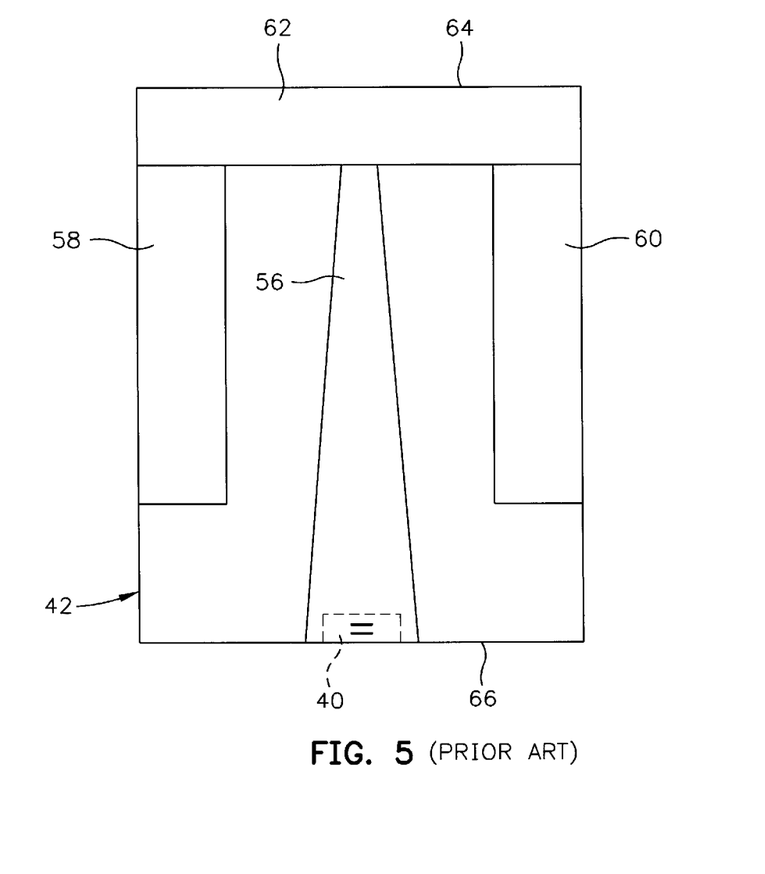
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
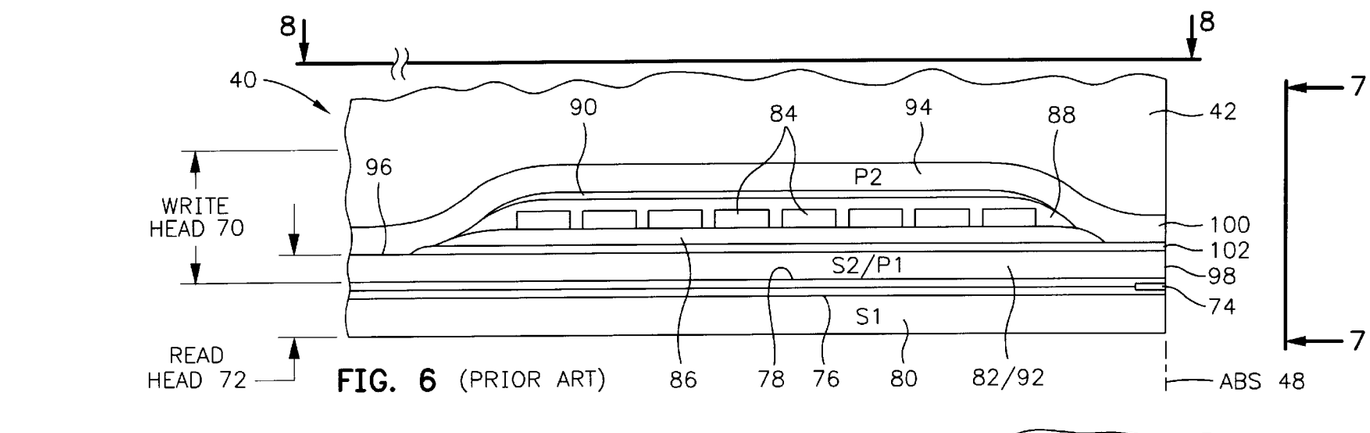
FIG. 6 is a partial view of the slider and a merged magnetic head as seen in plane 6—6 of FIG. 2.
Figure 7:
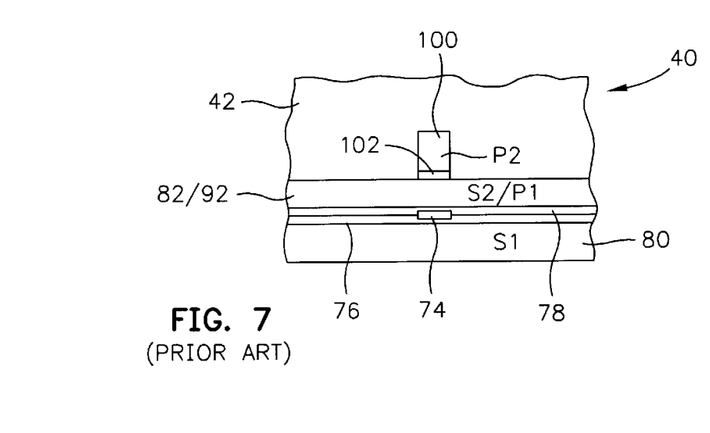
FIG. 7 is a partial ABS view of the slider taken along plane 7—7 of FIG. 6 to show the read and write elements of the merged magnetic head.

FIG. 6 is a side cross-sectional elevation view of a merged magnetic head 40, which includes a write head portion 70 and a read head portion 72, the read head portion employing a dual spin valve sensor 74 of the present invention. FIG. 7 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 8:
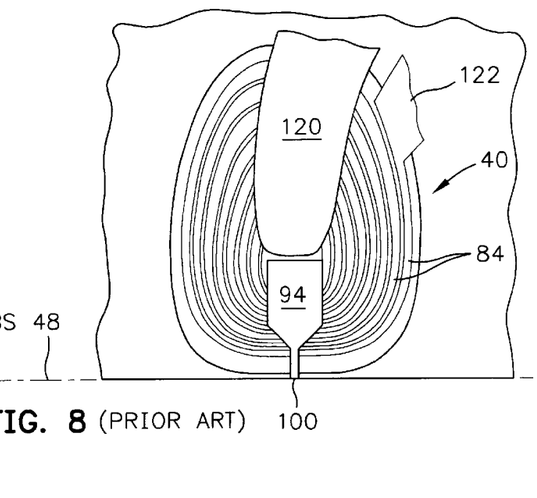
FIG. 8 is a view taken along plane 8—8 of FIG. 6 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head the second shield layer and the first pole piece layer are separate layers which are separated by a nonmagnetic layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
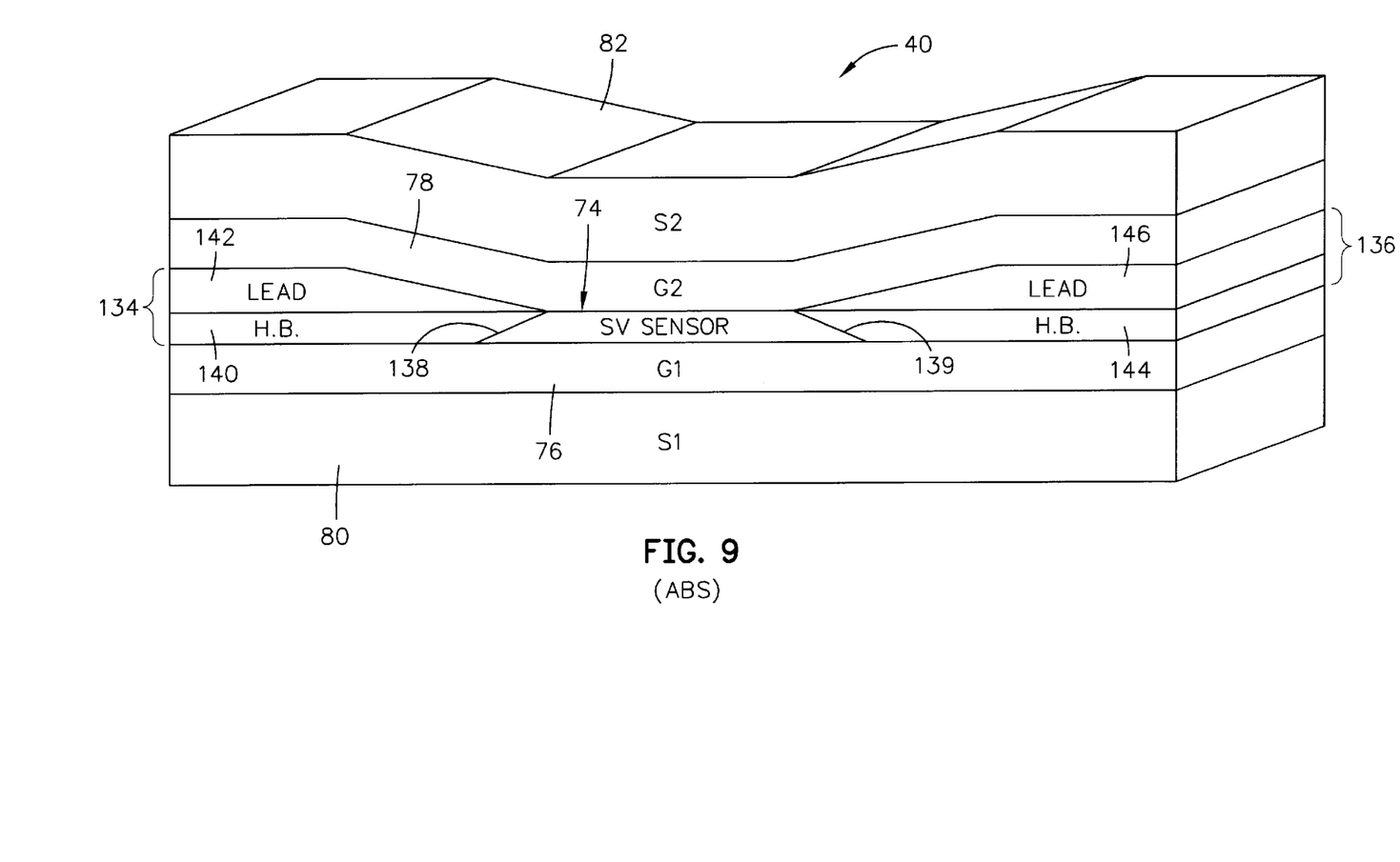
FIG. 9 is an enlarged isometric illustration of the read head with a spin valve sensor.
Figure 11:
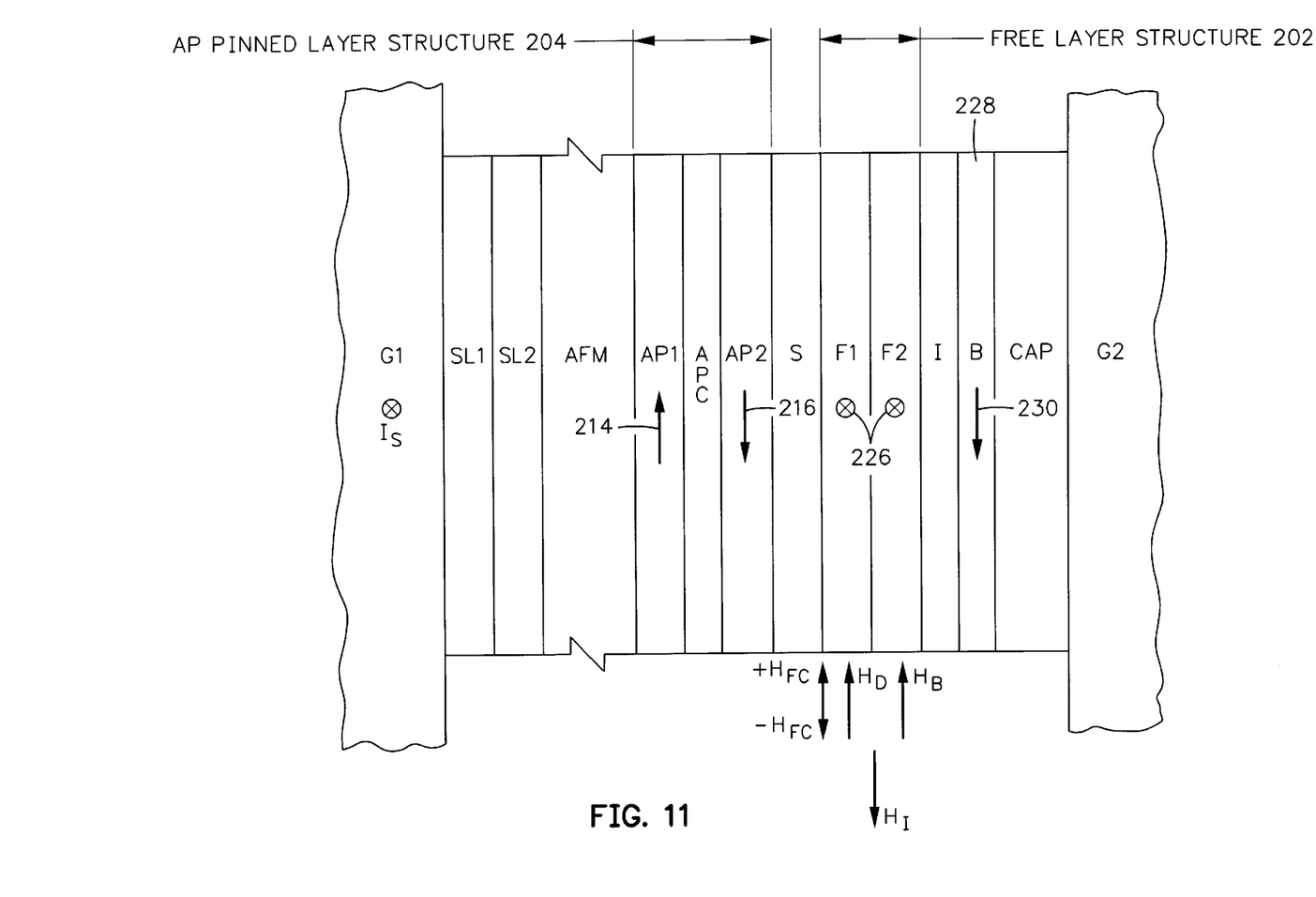
FIG. 11 is a view from the left end of FIG. 10 rotated 90° clockwise.

FIG. 11 is an enlarged isometric ABS illustration of the read head 40 shown in FIG. 9. The read head 40 includes the spin valve sensor 74. First and second hard bias and lead layers 134 and 136 are connected to first and second side edges 138 and 139 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 74 for stabilizing the magnetic domains therein. The spin valve sensor 74 and the first and second hard bias and lead layers 134 and 136 are located between the nonmagnetic electrically insulative first and second read gap layers 76 and 78. The first and second read gap layers 76 and 78 are, in turn, located between the ferromagnetic first and second shield layers 80 and 82.

The Invention

Figure 10:
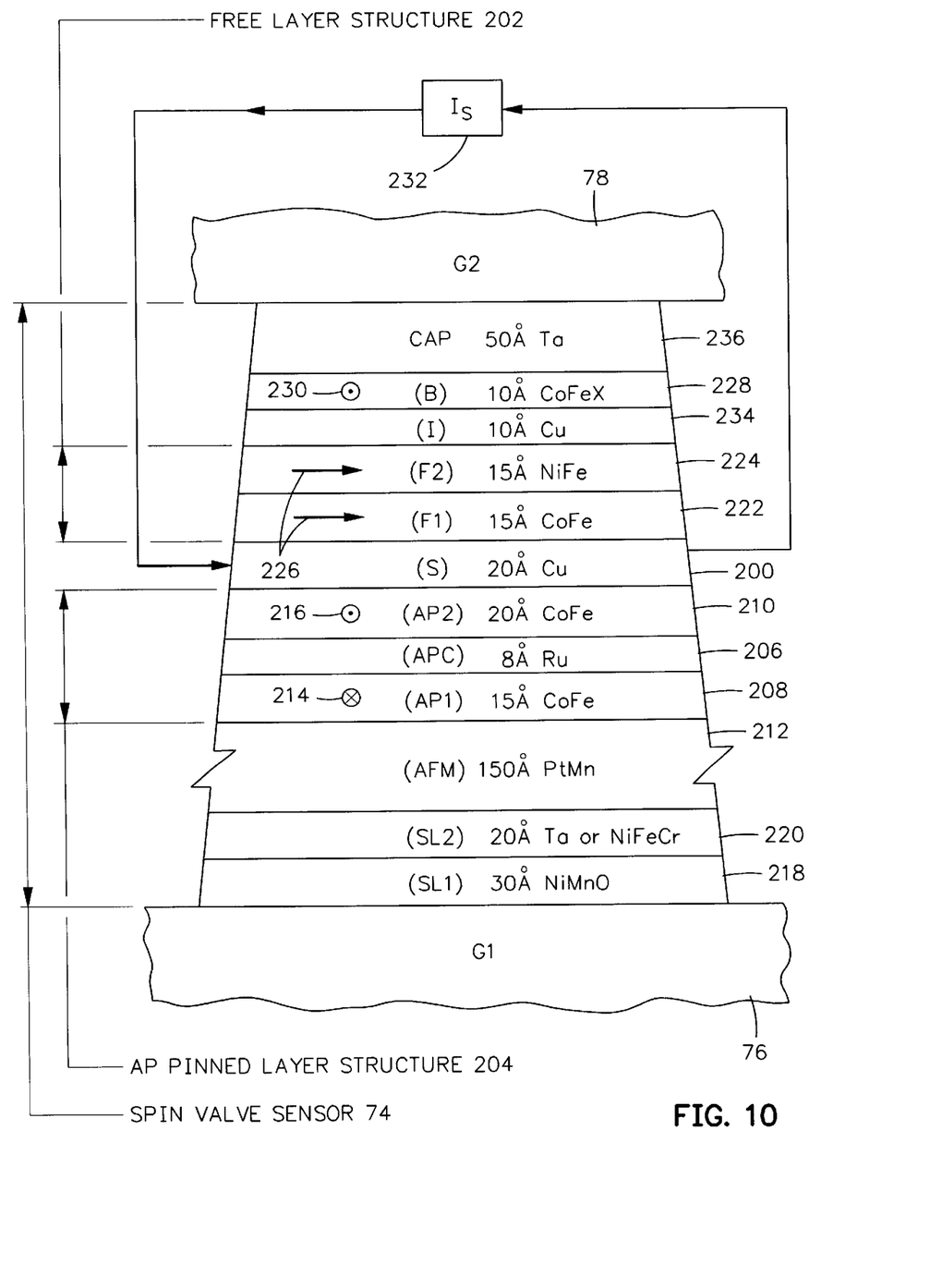
FIG. 10 is an ABS illustration of the present spin valve sensor.

FIG. 10 is an ABS illustration of the present spin valve sensor 74 located between the first and second read gap layers 76 and 78. The spin valve sensor includes a nonmagnetic spacer layer (S) 200 which is located between a ferromagnetic free layer structure 202 and a ferromagnetic pinned layer structure 204. The pinned layer structure 204 is preferably an antiparallel (AP) pinned layer structure which has an antiparallel coupling (APC) layer 206 which is located between and interfaces first and second AP pinned layers (AP1) and (AP2) 208 and 210. The first AP pinned layer 208 interfaces and is exchange coupled to an antiferromagnetic (AFM) pinning layer 212 which pins a magnetic moment 214 of the first AP pinned layer perpendicular to the ABS in a direction out of the sensor or into the sensor, as shown in FIG. 10. By strong antiparallel coupling between the first and second AP pinned layers 208 and 210 a magnetic moment 216 of the second AP pinned layer is antiparallel to the magnetic moment 214. First and second seed layers (SL1) and (SL2) 218 and 220 are provided for promoting a desirable microstructure of the layers deposited thereon.

The free layer structure 202 preferably has first and second free layers (F1) and (F2) 222 and 224. The first free layer 222 is composed of a cobalt based material, preferably cobalt iron ($Co_{90}Fe_{10}$), and the second free layer 224 is preferably composed of nickel iron ($Ni_{83}Fe_{17}$). The cobalt based first free layer 222 is next to the copper spacer layer 200 for promoting the magnetoresistive coefficient dr/R of the spin valve sensor. The free layer structure 202 has a magnetic moment 226 which is oriented parallel to the ABS and the major planes of the layers in a direction from right to left or from left to right, as shown in FIG. 10.

When a signal field from a rotating magnetic disk rotates the magnetic moment 226 of the free layer into the sensor the magnetic moments 226 and 216 become more antiparallel which increases the resistance of the sensor to the sense current $I_S$ and when a signal field rotates the magnetic moment 226 out of the sensor the magnetic moments 226 and 216 become more parallel which reduces the resistance of the sensor to the sense current $I_S$. These resistance changes are processed as playback signals by the processing circuitry 50 in FIG. 3.

FIG. 11, which is a view from the left end of FIG. 10 rotated 90° clockwise, shows the fields exerted on the free layer structure which should completely counterbalance each other so that the magnetic moment 226 of the free layer structure is oriented parallel to the ABS. The ferromagnetic coupling field $H_{FC}$, shown in phantom, is very small or zero and cannot be employed for counterbalancing the large sense current field $H_I$. As stated hereinabove, the net demagnetizing field $H_D$ from the AP pinned layer structure is not sufficient to counterbalance the sense current field $H_I$. The present invention provides a biasing layer (B) 228 which provides a demagnetizing field $H_B$ which is parallel to and supports the net demagnetizing field $H_D$ so as to completely counterbalance the sense current field $H_I$. Accordingly, the biasing layer 228 has a magnetic moment 230 which is parallel to the magnetic moment 216 of the second AP pinned layer. The processing circuitry 50 in FIG. 3 has means 232 shown in FIG. 10 for feeding the sense current $I_S$ through the spin valve sensor in a direction which causes the sense current field $H_I$ acting on the biasing layer 228 to orient the magnetic moment 230 of the biasing layer parallel to the magnetic moment 216 of the second AP pinned layer. It should be understood that the same result can be achieved by reversing directions of the magnetic moments 214, 216 and 230 and the direction of the sense current $I_S$ through the spin valve sensor. With this arrangement the directions of the fields $H_D$, $H_B$ and $H_I$ on the free layer structure 202 will be reversed. A nonmagnetic isolation layer (I) 234, which is preferably copper (Cu), is located between and interfaces each of the second free layer 224 and the biasing layer 228 for isolating the magnetisms of the second free layer 224 and the biasing layer 228. A cap layer 236 is located on the biasing layer 228 for protecting the spin valve sensor from subsequent processing steps.

In a preferred embodiment each of the first and second AP pinned layers 208 and 210 is composed of a cobalt based material, preferably cobalt iron ($Co_{90}Fe_{10}$), with the second AP pinned layer 210 being thicker than the first AP pinned layer 208. With this arrangement the cobalt based second AP pinned layer 210 next to the copper spacer layer 200 promotes the magnetoresistive coefficient dr/R of the sensor. Further, the biasing layer 228 is preferably composed of cobalt iron and an additional alloy (CoFeX) wherein X is selected from the group consisting of vanadium (V), chromium (Cr), hafnium (Hf), niobium (Nb) and oxygen (O). X increases the resistance of the biasing layer so that shunting of the sense current by the biasing layer 228 is reduced. Another advantage of the present invention is that the composition of the biasing layer 228 reflects conduction electrons back into the mean free path of conduction electrons for still further increasing the magnetoresistive coefficient dr/R of the spin valve sensor.

Exemplary thicknesses and materials of the layers are 30 Å of nickel manganese oxide for the first seed layer 218, 20 Å of tantalum or nickel iron chromium for the second seed layer 220, 150 Å of platinum manganese for the pinning layer 212, 15 Å of cobalt iron for the first AP pinned layer 208, 8 Å of ruthenium for the antiparallel coupling layer 206, 20 Å of cobalt iron for the second AP pinned layer 210, 20 Å of copper for the spacer layer 200, 15 Å of cobalt iron for the first free layer 222, 15 Å of nickel iron for the second free layer 224, 10 Å of copper for the isolation layer 234, 10 Å of cobalt iron and an additional element X for the biasing layer 228 and 50 Å of tantalum for the cap layer 236.

Discussion

It should be understood that the thicknesses and materials of the layers described hereinabove are exemplary. The preferred cobalt iron is $Co_{90}Fe_{10}$, the preferred nickel iron is $Ni_{83}Fe_{17}$ and the preferred platinum manganese is $Pt_{50}Mn_{50}$. It should be understood that cobalt (Co) may be substituted for cobalt iron (CoFe) and that other antiferromagnetic materials may be used for the pinning layer such as nickel manganese (NiMn) or iridium manganese (IrMn). It should be understood that the present invention may be employed in a top or bottom spin valve sensor, a spin valve sensor which employs either a simple pinned or antiparallel pinned layer structure and a single or dual spin valve sensor. It should still further be understood that the present invention includes the method of making of the spin valve sensors 200 and 300 shown in FIGS. 10 and 11.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head which has an air bearing surface (ABS), comprising:
    a spin valve sensor including:
        a ferromagnetic pinned layer structure that has a magnetic moment;
        a pinning layer exchange coupled to the pinned layer structure for pinning the magnetic moment of the pinned layer structure;
        a ferromagnetic free layer that has a magnetic moment;
        a nonmagnetic electrically conductive spacer layer located between the free layer and the pinned layer structure;
        a ferromagnetic biasing layer that has a magnetic moment;
        a nonmagnetic isolation layer located between and interfacing each of the free layer structure and the biasing layer;
        each of the pinned layer structure and the biasing layer exerting a demagnetizing field $H_D$ on the free layer structure; and
        the demagnetizing fields of the pinned layer structure and the biasing layer being parallel with respect to one another.

2. A magnetic read head as claimed in claim 1 including:
    nonmagnetic electrically nonconductive first and second read gap layers;
    the spin valve sensor being located between the first and second read gap layers;
    ferromagnetic first and second shield layers; and
    the first and second read gap layers being located between the first and second shield layers.

3. A magnetic read head as claimed in claim 2 wherein the pinned layer structure is an antiparallel (AP) pinned layer structure comprising:
    first and second antiparallel (AP) pinned layers and an antiparallel coupling (APC) layer with the APC layer located between and interfacing each of the first second AP pinned layers;
    one of the first and second AP pinned layers being magnetically thicker than a magnetic thickness of the other AP pinned layer so that the AP pinned layer structure has a net demagnetizing field that is equal to said demagnetizing field exerted on the free structure by the pinned layer structure.

4. A magnetic read head as claimed in claim 3 including:
    the second AP pinned layer interfacing the spacer layer and being magnetically thicker than the first AP pinned layer; and
    the second AP pinned layer being composed of a cobalt based layer.

5. A magnetic read head as claimed in claim 2 the biasing layer being composed of CoFeX where X is selected from the group consisting of vanadium (V), chromium (Cr), hafnium (Hf) and niobium (Nb).

6. (Currently Amended) A magnetic read head as claimed in claim 2 including:
   means for feeding a sense current $I_S$ through the spin valve sensor in a direction which pins a direction of the magnetic moment of the biasing layer;
   said direction of the sense current causing a sense current field $H_1$ at the free layer structure that is antiparallel to the demagnetizing fields of the pinned layer structure and the biasing layer; and
   the demagnetizing field of the pinned layer structure plus the demagnetizing field of the biasing layer being equal to the sense current field $H_I$.

7. A magnetic read head as claimed in claim 6 wherein the pinned layer structure is an antiparallel (AP) pinned layer structure comprising:
   first and second antiparallel (AP) pinned layers and an antiparallel coupling (APC) layer with the APC layer located between and interfacing each of the first second AP pinned layers;
   one of the first and second AP pinned layers being magnetically thicker than a magnetic thickness of the other AP pinned layer so that the AP pinned layer structure has a net demagnetizing field that is equal to said demagnetizing field exerted on the free structure by the pinned layer structure.

8. A magnetic read head as claimed in claim 7 including:
   the second AP pinned layer interfacing the spacer layer and being magnetically thicker than the first AP pinned layer; and
   the second AP pinned layer being composed of a cobalt based layer.

9. A magnetic read head as claimed in claim 8 the biasing layer being composed of CoFeX where X is selected from the group consisting of vanadium (V), chromium (Cr), hafnium (Hf) and niobium (Nb).

10. A magnetic head assembly having an air bearing surface (ADS), comprising:
    a write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions; and
    a read head including:
      a spin valve sensor;
      nonmagnetic electrically nonconductive first and second read gap layers;
      the spin valve sensor being located between the first and second read gap layers;
      a ferromagnetic first shield layer; and
      the first and second gap layers being located between the first shield layer and the first pole piece layer; and
    the spin valve sensor including:
      a ferromagnetic pinned layer structure that has a magnetic moment;
      a pinning layer exchange coupled to the pinned layer structure for pinning the magnetic moment of the pinned layer structure;
      a ferromagnetic free layer that has a magnetic moment;
      a nonmagnetic electrically conductive spacer layer located between the free layer and the pinned layer structure;
      a ferromagnetic biasing layer that has a magnetic moment;
      a nonmagnetic isolation layer located between and interfacing each of the free layer structure and the biasing layer;
      each of the pinned layer structure and the biasing layer exerting a demagnetizing field $H_D$ on the free layer structure; and
      the demagnetizing fields of the pinned layer structure and the biasing layer being parallel with respect to one another.

11. A magnetic head assembly as claimed in claim 10 wherein the pinned layer structure is an antiparallel (AP) pinned layer structure comprising:
    first and second antiparallel (AP) pinned layers and an antiparallel coupling (APC) layer with the APC layer located between and interfacing each of the first second AP pinned layers;
    one of the first and second AP pinned layers being magnetically thicker than a magnetic thickness of the other AP pinned layer so that the AP pinned layer structure has a net demagnetizing field that is equal to said demagnetizing field exerted on the free structure by the pinned layer structure.

12. A magnetic head assembly as claimed in claim 11 including:
    the second AP pinned layer interfacing the spacer layer and being magnetically thicker than the first AP pinned layer; and
    the second AP pinned layer being composed of a cobalt based layer.

13. A magnetic head assembly as claimed in claim 10 the biasing layer being composed of CoFeX where X is selected from the group consisting of vanadium (V), chromium (Cr), hafnium (Hf) and niobium (Nb).

14. (Currently Amended) A magnetic head assembly as claimed in claim 10 including:
    means for feeding a sense current $I_S$ through the spin valve sensor in a direction which pins a direction of the magnetic moment of the biasing layer;
    said direction of the sense current causing a sense current field $H_I$ at the free layer structure that is antiparallel to the demagnetizing fields of the pinned layer structure and the biasing layer; and
    the demagnetizing field of the pinned layer structure plus the demagnetizing field of the biasing layer being equal to the sense current field $H_I$.

15. A magnetic head assembly as claimed in claim 14 wherein the pinned layer structure is an antiparallel (AP) pinned layer structure comprising:
    first and second antiparallel (AP) pinned layers and an antiparallel coupling (APC) layer with the APC layer located between and interfacing each of the first second AP pinned layers;
    one of the first and second AP pinned layers being magnetically thicker than a magnetic thickness of the other AP pinned layer so that the AP pinned layer structure has a net demagnetizing field that is equal to said demagnetizing field exerted on the free structure by the pinned layer structure.

16. A magnetic head assembly as claimed in claim 15 including:

the second AP pinned layer interfacing the spacer layer and being magnetically thicker than the first AP pinned layer; and the second AP pinned layer being composed of a cobalt based layer.

17. A magnetic head assembly as claimed in claim 16 the biasing layer being composed of CoFeX where X is selected from the group consisting of vanadium (V), chromium (Cr), hafnium (Hf) and niobium (Nb).

18. A magnetic disk drive including at least one magnetic head assembly that has an air bearing surface (ABS) and that includes a write head and a read head, comprising:

a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and a read head including:
a spin valve sensor;
nonmagnetic electrically nonconductive first and second read gap layers;
the spin valve sensor being located between the first and second read gap layers;
a ferromagnetic first shield layer; and
the first and second read gap layers being located between the first shield layer and the first pole piece layer; and the spin valve sensor including:
a ferromagnetic pinned layer structure that has a magnetic moment;
a pinning layer exchange coupled to the pinned layer structure for pinning the magnetic moment of the pinned layer structure;
a ferromagnetic free layer that has a magnetic moment;
a nonmagnetic electrically conductive spacer layer located between the free layer and the pinned layer structure;
a ferromagnetic biasing layer that has a magnetic moment;
a nonmagnetic isolation layer located between and interfacing each of the free layer structure and the biasing layer;
each of the pinned layer structure and the biasing layer exerting a demagnetizing field HD on the free layer structure; and
the demagnetizing fields of the pinned layer structure and the biasing layer being parallel with respect to one another;

a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator for exchanging signals with the magnetic head assembly, for controlling movement of the magnetic disk and for controlling the position of the magnetic head assembly.

19. A magnetic disk drive as claimed in claim 18 wherein the pinned layer structure is an antiparallel (AP) pinned layer structure comprising:

first and second antiparallel (AP) pinned layers and an antiparallel coupling (APC) layer with the APC layer located between and interfacing each of the first second AP pinned layers;

one of the first and second AP pinned layers being magnetically thicker than a magnetic thickness of the other AP pinned layer so that the AP pinned layer structure has a net demagnetizing field that is equal to said demagnetizing field exerted on the free structure by the pinned layer structure.

20. A magnetic disk drive as claimed in claim 19 including:

the second AP pinned layer interfacing the spacer layer and being magnetically thicker than the first AP pinned layer; and the second AP pinned layer being composed of a cobalt based layer.

21. A magnetic disk drive as claimed in claim 18 the biasing layer being composed of CoFeX where X is selected from the group consisting of vanadium (V), chromium (Cr), hafnium (Hf) and niobium (Nb).

22. A magnetic disk drive as claimed in claim 18 including:

means for feeding a sense current $I_S$ through the spin valve sensor in a direction which pins a direction of the magnetic moment of the biasing layer;

said direction of the sense current causing a sense current field $H_I$ at the free layer structure that is antiparallel to the demagnetizing fields of the pinned layer structure and the biasing layer; and the demagnetizing field of the pinned layer structure plus the demagnetizing field of the biasing layer being equal to the sense current field $H_I$.

23. A magnetic disk drive as claimed in claim 22 wherein the pinned layer structure is an antiparallel (AP) pinned layer structure comprising:

first and second antiparallel (AP) pinned layers and an antiparallel coupling (APC) layer with the APC layer located between and interfacing each of the first second AP pinned layers;

one of the first and second AP pinned layers being magnetically thicker than a magnetic thickness of the other AP pinned layer so that the AP pinned layer structure has a net demagnetizing field that is equal to said demagnetizing field exerted on the free structure by the pinned layer structure.

24. A magnetic disk drive as claimed in claim 23 including:

the second AP pinned layer interfacing the spacer layer and being magnetically thicker than the first AP pinned layer; and the second AP pinned layer being composed of a cobalt based layer.

25. A magnetic disk drive as claimed in claim 24 the biasing layer being composed of CoFeX where X is selected from the group consisting of vanadium (V), chromium (Cr), hafnium (Hf) and niobium (Nb).

26. A method of making a magnetic read head which has an air bearing surface (ABS), comprising the steps of:

a making a spin valve sensor comprising the steps of:
forming a ferromagnetic pinned layer structure that has a magnetic moment;
forming a pinning layer exchange coupled to the pinned layer structure for pinning the magnetic moment of the pinned layer structure;
forming a ferromagnetic free layer that has a magnetic moment;
forming a nonmagnetic electrically conductive spacer layer located between the free layer and the pinned layer structure;
forming a ferromagnetic biasing layer that has a magnetic moment;
forming a nonmagnetic isolation layer between and interfacing each of the free layer structure and the biasing layer;
forming each of the pinned layer structure and the biasing layer with a demagnetizing field HD that is exerted on the free layer structure with the demagnetizing fields of the pinned layer structure and the biasing layer parallel with respect to one another.

27. A method as claimed in claim 26 including:
forming nonmagnetic electrically nonconductive first and second read gap layers;
forming the spin valve sensor between the first and second read gap layers;
forming ferromagnetic first and second shield layers; and
forming the first and second read gap layers between the first and second shield layers.

28. A method as claimed in claim 27 wherein the pinned layer structure is an antiparallel (AP) pinned layer structure made comprising the steps of:
forming first and second antiparallel (AP) pinned layers and an antiparallel coupling (APC) layer with the APC layer located between and interfacing each of the first second AP pinned layers;
forming one of the first and second AP pinned layers magnetically thicker than a magnetic thickness of the other AP pinned layer so that the AP pinned layer structure has a net demagnetizing field that is equal to said demagnetizing field exerted on the free structure by the pinned layer structure.

29. A method as claimed in claim 28 including:
forming the second AP pinned layer interfacing the spacer layer and magnetically thicker than the first AP pinned layer; and
forming the second AP pinned layer being of a cobalt based layer.

30. A method as claimed in claim 27 wherein the biasing layer is formed of CoFeX where X is selected from the group consisting of vanadium (V), chromium (Cr), hafnium (Hf) and niobium (Nb).

31. A method as claimed in claim 27 including the step of:
forming means for feeding a sense current Is through the spin valve sensor in a direction which pins a direction of the magnetic moment of the biasing layer with said direction of the sense current causing a sense current field H1 at the free layer structure that is antiparallel to the demagnetizing fields of the pinned layer structure and the biasing layers with the demagnetizing field of the pinned layer structure plus the demagnetizing field of the biasing layer being equal to the sense current field $H_I$.

32. A method as claimed in claim 31 wherein the pinned layer structure is an antiparallel (AP) pinned layer structure made comprising the steps of:
forming first and second antiparallel (AP) pinned layers and an antiparallel coupling (APC) layer with the APC layer located between and interfacing each of the first second AP pinned layers;
forming one of the first and second AP pinned layers magnetically thicker than a magnetic thickness of the other AP pinned layer so that the AP pinned layer structure has a net demagnetizing field that is equal to said demagnetizing field exerted on the free structure by the pinned layer structure.

33. A method as claimed in claim 32 including:
forming the second AP pinned layer interfacing the spacer layer and magnetically thicker than the first AP pinned layer; and
forming the second AP pinned layer being of a cobalt based layer.

34. A method as claimed in claim 33 wherein the biasing layer is formed of CoFeX where X is selected from the group consisting of vanadium (V), chromium (Cr), hafnium (Hf) and niobium (Nb).

35. A method of making magnetic head assembly that has an air bearing surface (ABS), comprising the steps of:
making a write head including the steps of:
forming ferromagnetic first and second pole piece layers in pole tip, yoke and back gap regions wherein the yoke region is located between the pole tip and back gap regions;
forming a nonmagnetic electrically nonconductive write gap layer between the first and second pole piece layers in the pole tip region;
forming an insulation stack with at least one coil layer embedded therein between the first and second pole piece layers in the yoke region; and
connecting the first and pole piece layers at said back gap region; and
making a read head including the steps of:
forming nonmagnetic electrically nonconductive first and second read gap layers;
forming a spin valve sensor between the first and second read gap layers;
forming the first and second read gap layers between the first shield layer and the first pole piece layer; and
a making of the spin valve sensor comprising the steps of:
forming a ferromagnetic pinned layer structure that has a magnetic moment;
forming a pinning layer exchange coupled to the pinned layer structure for pinning the magnetic moment of the pinned layer structure;
forming a ferromagnetic free layer that has a magnetic moment;
forming a nonmagnetic electrically conductive spacer layer located between the free layer and the pinned layer structure;
forming a ferromagnetic biasing layer that has a magnetic moment;
forming a nonmagnetic isolation layer between and interfacing each of the free layer structure and the biasing layer;
forming each of the pinned layer structure and the biasing layer with a demagnetizing field HD that is exerted on the free layer structure with the demagnetizing fields of the pinned layer structure and biasing layer being parallel with respect to one another.

36. A method as claimed in claim 35 wherein the pinned layer structure is an antiparallel (AP) pinned layer structure made comprising the steps of:

forming first and second antiparallel (AP) pinned layers and an antiparallel coupling (APC) layer with the APC layer located between and interfacing each of the first second AP pinned layers;

forming one of the first and second AP pinned layers magnetically thicker than a magnetic thickness of the other AP pinned layer so that the AP pinned layer structure has a net demagnetizing field that is equal to said demagnetizing field exerted on the free structure by the pinned layer structure.

37. A method as claimed in claim 36 including:

forming the second AP pinned layer interfacing the spacer layer and magnetically thicker than the first AP pinned layer; and forming the second AP pinned layer being of a cobalt based layer.

38. A method as claimed in claim 35 wherein the biasing layer is formed of CoFeX where X is selected from the group consisting of vanadium (V), chromium (Cr), hafnium (Hf) and niobium (Nb).

39. A method as claimed in claim 35 including the step of:

forming means for feeding a sense current $I_S$ through the spin valve sensor in a direction which pins a direction of the magnetic moment of the biasing layer with said direction of the sense current causing a sense current field $H_I$ at the free layer structure that is antiparallel to the demagnetizing fields of the pinned layer structure and the biasing layer with the demagnetizing field of the pinned layer structure plus the demagnetizing field of the biasing layer being equal to the sense current field $H_I$.

40. A method as claimed in claim 39 wherein the pinned layer structure is an antiparallel (AP) pinned layer structure made comprising the steps of:

forming first and second antiparallel (AP) pinned layers and an antiparallel coupling (APC) layer with the APC layer located between and interfacing each of the first second AP pinned layers;

forming one of the first and second AP pinned layers magnetically thicker than a magnetic thickness of the other AP pinned layer so that the AP pinned layer structure has a net demagnetizing field that is equal to said demagnetizing field exerted on the free structure by the pinned layer structure.

41. A method as claimed in claim 40 including:

forming the second AP pinned layer interfacing the spacer layer and magnetically thicker than the first AP pinned layer; and forming the second AP pinned layer being of a cobalt based layer.

42. A method as claimed in claim 41 wherein the biasing layer is formed of CoFeX where X is selected from the group consisting of vanadium (V), chromium (Cr), hafnium (Hf) and niobium (Nb).

* * * * *